United States Patent
Akagi et al.

(10) Patent No.: US 10,347,301 B2
(45) Date of Patent: Jul. 9, 2019

(54) BASE UNIT AND DISK DRIVE APPARATUS

(71) Applicant: Nidec Corporation, Minami-ku, Kyoto (JP)

(72) Inventors: Masahiro Akagi, Kyoto (JP); Takeshi Ohiro, Kyoto (JP); Tomohiro Yoneda, Kyoto (JP); Akihiro Yudate, Kyoto (JP); Takayuki Ishino, Kyoto (JP); Sho Nakamura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/104,585

(22) Filed: Aug. 17, 2018

(65) Prior Publication Data

US 2018/0374514 A1 Dec. 27, 2018

Related U.S. Application Data

(63) Continuation-in-part of application No. 15/783,128, filed on Oct. 13, 2017, now Pat. No. 10,068,622, (Continued)

(30) Foreign Application Priority Data

Dec. 28, 2015 (JP) .................... 2015-257080

(51) Int. Cl.
 *G11B 33/12* (2006.01)
 *G11B 33/14* (2006.01)
 (Continued)

(52) U.S. Cl.
 CPC ........ *G11B 33/1466* (2013.01); *G11B 25/043* (2013.01); *G11B 33/027* (2013.01); (Continued)

(58) Field of Classification Search
 None
 See application file for complete search history.

(56) References Cited

U.S. PATENT DOCUMENTS 9,886,984 B2 * 2/2018 Akagi .................. G11B 33/027
10,068,622 B2 * 9/2018 Akagi .................. G11B 33/027

OTHER PUBLICATIONS

Akagi et al., "Base Unite and Disk Drive Apparatus", U.S. Appl. No. 15/783,128, filed Oct. 13, 2017.

* cited by examiner

*Primary Examiner* — William J Klimowicz
(74) *Attorney, Agent, or Firm* — Keating & Bennett, LLP (57) ABSTRACT

A base member includes a recessed portion extending in radial directions and recessed upward from a lower surface of the base member and a hole extending through the recessed portion in the vertical direction. The recessed portion includes a recessed portion loop-shaped surface defining a loop-shaped surface in the radial direction. A connector is located on a lower side of the recessed portion to cover the hole portion. An adhesive is located between the connector and the recessed portion. A minimum value of a gap distance in the radial direction between an outer end of the connector and an inner end of the recessed portion in which the outer end of the connector and the inner end of the recessed portion are opposed to each other with the adhesive therebetween is greater than a minimum value of a gap in the vertical direction distance between an upper surface of the connector and the recessed portion loop-shaped surface, in which the upper surface of the connector and the recessed portion loop-shaped surface are opposed to each other with the adhesive therebetween. The adhesive includes an inorganic filler.

7 Claims, 9 Drawing Sheets

Related U.S. Application Data which is a continuation of application No. 15/376,797, filed on Dec. 13, 2016, now Pat. No. 9,886,984.

(51) Int. Cl.
  *G11B 25/04* (2006.01)
  *G11B 33/02* (2006.01)
(52) U.S. Cl.
  CPC ............ *G11B 33/12* (2013.01); *G11B 33/122* (2013.01); *G11B 33/1446* (2013.01); *G11B 33/1486* (2013.01)

| No. | Helium permiability [cc·mm/(atm·s·cm^2)] | Inorganic Filler | wt% | vol% |
|---|---|---|---|---|
| 1 | 4.09137E-08 | Fused silica | 45.0 | 27.8 |
| 2 | 3.77551E-07 | Silica | 5.5 | 2.7 |
| 3 | 2.21134E-07 | Calcium carbonate & Silica | 28.0 | 15.5 |
| 4 | 6.12322E-08 | Aluminum oxide | 50.0 | 24.0 |
| 5 | 9.6967E-08 | Aluminum | 45.0 | 27.5 |
| 6 | 4.6173E-08 | Aluminum | 45.0 | 27.5 |
| 7 | 7.35595E-08 | Aluminum | 55.0 | 36.1 |
| 8 | 6.36575E-08 | Aluminum | 50.0 | 31.6 |
| 9 | 1.98404E-09 | Silica | 67.0 | 48.9 |
| 10 | 1.20453E-08 | Silica | 60.0 | 41.4 |
| 11 | 1.71043E-08 | Silica | 50.0 | 32.1 |

Fig. 9

BASE UNIT AND DISK DRIVE APPARATUS

CROSS REFERENCE TO RELATED APPLICATIONS

This application claims the benefit of priority to Japanese Patent Application No. 2015-257080 filed on Dec. 28, 2015. The entire contents of this application are hereby incorporated herein by reference.

Further, this application is a continuation-in-part of, and claims the benefit of the filing date of, U.S. patent application Ser. No. 15/783,128, filed Oct. 13, 2017, which is a continuation of and claims the benefit of the filing date of U.S. patent application Ser. No. 15/376,797, filed Dec. 13, 2016, now U.S. Pat. No. 9,886,984, each of which are incorporated herein by reference in their entirety.

BACKGROUND OF THE INVENTION

1. Field of the Invention

The present invention relates to a base unit for use in a disk drive apparatus.

2. Description of the Related Art

Disk drive apparatuses, such as, for example, hard disk drive (HDD) apparatuses, are often arranged to rotate disks at high speeds. In such an apparatus, each disk receives resistance caused by a gas enclosed in the apparatus, and this may cause a vibration of the disk and an error in reading or writing, an increase in a power consumption of a motor, or other problems. In particular, in recent years, the storage capacity of HDD apparatuses or the like has been increasing, and the number of disks has been increasing, and it has become important to take measures against the above problems.

Accordingly, instead of air, a gas (which may be hereinafter referred to as a low-density gas) having a density lower than that of air is sealed in a known disk drive apparatus to reduce the aforementioned resistance during rotation of the disk. As this low-density gas, helium or the like is used, for example.

In such a disk drive apparatus, it is important to improve the sealing of the low-density gas. JP-A 2008-171482, for example, discloses a disk drive apparatus including a base and a cover, and having a low-density gas sealed in a housing space defined by the base and the cover fixed to each other.

In this disk drive apparatus, a feedthrough, which is a connector of one type, is joined to the base through a solder so as to close an opening defined in the base to prevent the low-density gas from leaking out of the base through the opening.

However, as noted in JP-A 2008-171482, a flange of the feedthrough and the base have different coefficients of thermal expansion, and therefore, an application of a stress to a solder joint with low stress resistance might cause a crack in the solder joint, resulting in a failure to sufficiently seal in the low-density gas.

It is thus conceivable to use an adhesive which is more resistant to heat shock than the solder and is also inexpensive as a material for joining the base and the connector to each other.

SUMMARY OF THE INVENTION

A base unit according to a preferred embodiment of the present invention is for use in a disk drive apparatus in which a gas with a density lower than that of air is sealed in a housing space defined by a base member and a cover fixed to each other. The base unit includes the base member that supports a motor rotatable about a central axis extending in a vertical direction, and a connector electrically connected to a wire in the housing space. The base member includes a recessed portion that extends in radial directions and is recessed upward from a lower surface of the base member, and a hole extending through the recessed portion in the vertical direction. The recessed portion includes a recessed portion loop-shaped surface defining a loop-shaped surface in the radial direction. The connector is located on a lower side of the recessed portion to cover the hole. An adhesive is located between the connector and the recessed portion. A minimum value of a gap distance in the radial direction between an outer end of the connector and an inner end of the recessed portion in which the outer end of the connector and the inner end of the recessed portion are opposed to each other with the adhesive therebetween is greater than a minimum value of a gap in the vertical direction distance between an upper surface of the connector and the recessed portion loop-shaped surface, in which the upper surface of the connector and the recessed portion loop-shaped surface are opposed to each other with the adhesive therebetween. The adhesive includes an inorganic filler.

The base unit according to a preferred embodiment of the present invention improves the sealing of the low-density gas in a structure in which the connector is fixed to the base member through the adhesive.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, exemplary preferred embodiments of the present invention will be described with reference to the accompanying drawings. It is assumed herein that a direction in which a central axis about which a spindle motor is rotatable extends is referred to by the term "vertical direction", "vertical", or "vertically", and that directions perpendicular to the vertical direction and directions parallel to these directions are each referred to by the term "radial direction", "radial", or "radially". It is also assumed herein that a direction along a circular arc centered on the central axis is referred to by the term "circumferential direction", "circumferential", or "circumferentially". It is also assumed herein that the side on which a cover is arranged with respect to a base member is an upper side in the vertical direction. The shape of each member or portion and relative positions of different members or portions will be described based on the above assumptions. Note, however, that the above definitions of the vertical direction and the upper and lower sides are simply made for the sake of convenience in description, and should not be construed to restrict the orientation of a base unit or a disk drive apparatus according to any preferred embodiment of the present invention when in use.

Figure 1:
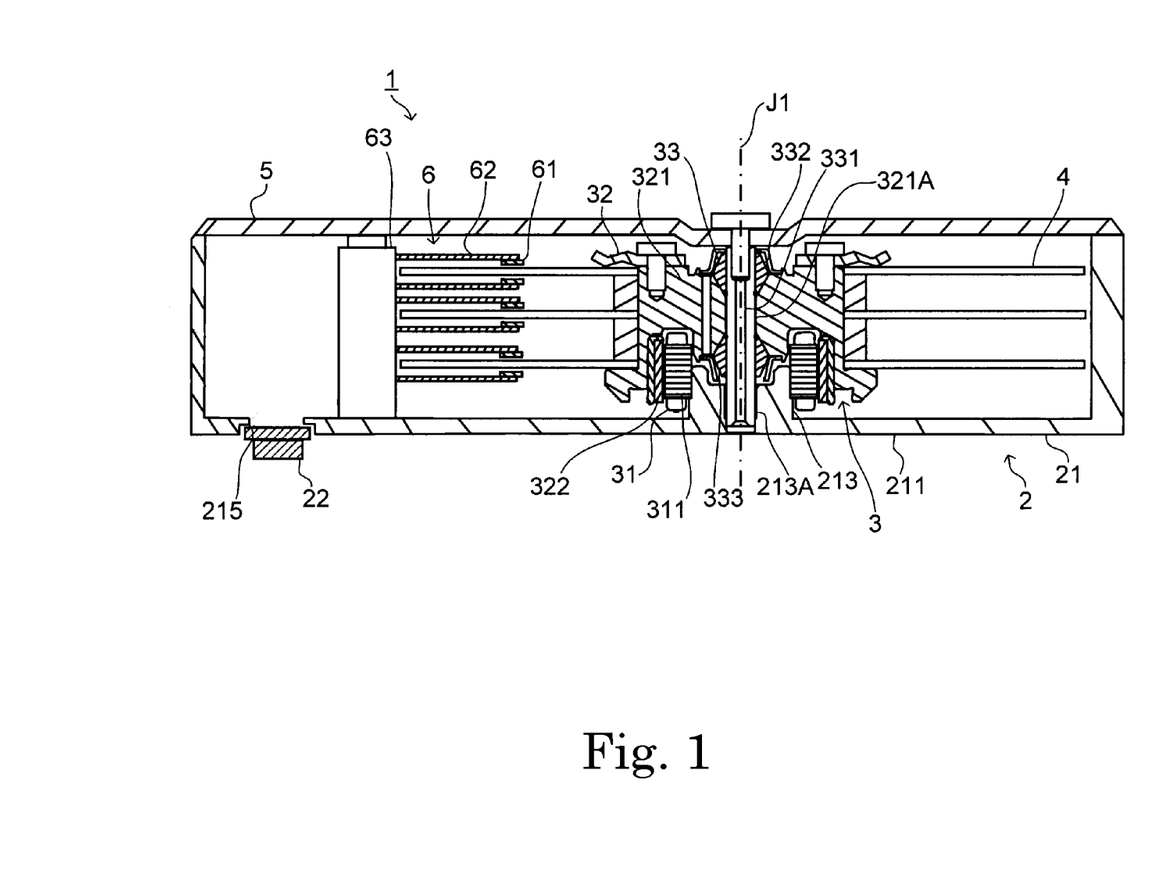
FIG. 1 is a vertical sectional view of a disk drive apparatus according to a preferred embodiment of the present invention.

FIG. 1 is a vertical sectional view of a disk drive apparatus 1 according to a preferred embodiment of the present invention. The upper side in FIG. 1 corresponds to the upper side in the vertical direction. The disk drive apparatus 1 is an apparatus arranged to perform reading and writing of information from or to magnetic disks 4 while rotating the magnetic disks 4. The disk drive apparatus 1 includes a base unit 2, a spindle motor 3, the magnetic disks 4, a cover 5, and an access portion 6.

The base unit 2 includes a base member 21 arranged to support the spindle motor 3, and a connector 22. The spindle motor 3 is capable of rotating about a central axis J1. The spindle motor 3 is arranged to rotate the magnetic disks 4, which are three in number, about the central axis J1 while supporting the magnetic disks 4. The spindle motor 3 and the access portion 6 are accommodated in a housing space of a case defined by the base member 21 and the cover 5. The access portion 6 is arranged to move heads 61 along recording surfaces of the magnetic disks 4 to perform the reading and the writing of information from or to the magnetic disks 4.

The cover 5 is joined and fixed to the base member 21 on the upper side of the base member 21. A junction of the base member 21 and the cover 5 is sealed by a sealant, such as an elastomer, or an adhesive, or through welding, for example. In addition, a gas having a density lower than that of air is sealed in the housing space of the case defined by the base member 21 and the cover 5. As the low-density gas, a helium gas, a nitrogen gas, a mixture of helium and nitrogen gases, or the like is preferably used. This contributes to reducing resistance applied to each magnetic disk 4, and thus to reducing vibrations of the magnetic disks 4 which occur during rotation, and minimizing an increase in a power consumption of the motor 3.

Note that the disk drive apparatus 1 may alternatively be arranged to include one, two, or more than three magnetic disks. Also note that the access portion 6 may alternatively be arranged to perform only one of the reading and the writing of information from or to the magnetic disks 4.

The spindle motor 3 includes a stator 31, a rotating portion 32, and a stationary portion 33. The stator 31 includes coils 311. The stator 31 is fixed to an outer circumference of a bearing fixing portion 213 of the base member 21. The bearing fixing portion 213 is arranged to project upward from a bottom portion 211 of the base member 21 to assume a substantially cylindrical shape.

The rotating portion 32 includes a rotor hub 321 and a rotor magnet 322. A shaft hole portion 321A extending in the vertical direction is defined in a center of the rotor hub 321. The rotor hub 321 is arranged to support the magnetic disks 4. The stationary portion 33 includes a shaft 331, a first cone portion 332, and a second cone portion 333. The shaft 331 is inserted through the shaft hole portion 321A of the rotor hub 321. The shaft 331 is inserted and fixed in an opening portion 213A defined inside of the bearing fixing portion 213, and is thus held while being oriented in the vertical direction along the central axis J1. Each of the first and second cone portions 332 and 333 is fixed to the shaft 331. While the spindle motor 3 is running, a fluid dynamic pressure is generated in a lubricating oil in a gap between the rotor hub 321 and each of the first and second cone portions 332 and 333. The rotor hub 321 is thus supported to be rotatable with respect to the shaft 331.

The access portion 6 includes the heads 61, arms 62, and a head actuator mechanism 63. Two of the heads 61 and two of the arms 62 are provided for each one of the magnetic disks 4. Each of the two arms 62 supports one of the heads 61. Each head 61 is arranged to perform the reading and the writing of information while being arranged in close proximity to the corresponding magnetic disk 4. The head actuator mechanism 63 is arranged to actuate each of the arms 62 to move an associated one of the heads 61 relative to a corresponding one of the magnetic disks 4. The head 61 is thus arranged to make access to a desired location on the rotating magnetic disk 4 while being arranged in close proximity to the magnetic disk 4, to carry out the reading and the writing of information. Note that the head 61 may be arranged to perform at least one of the reading and the writing of information from or to the magnetic disk 4.

Figure 2:
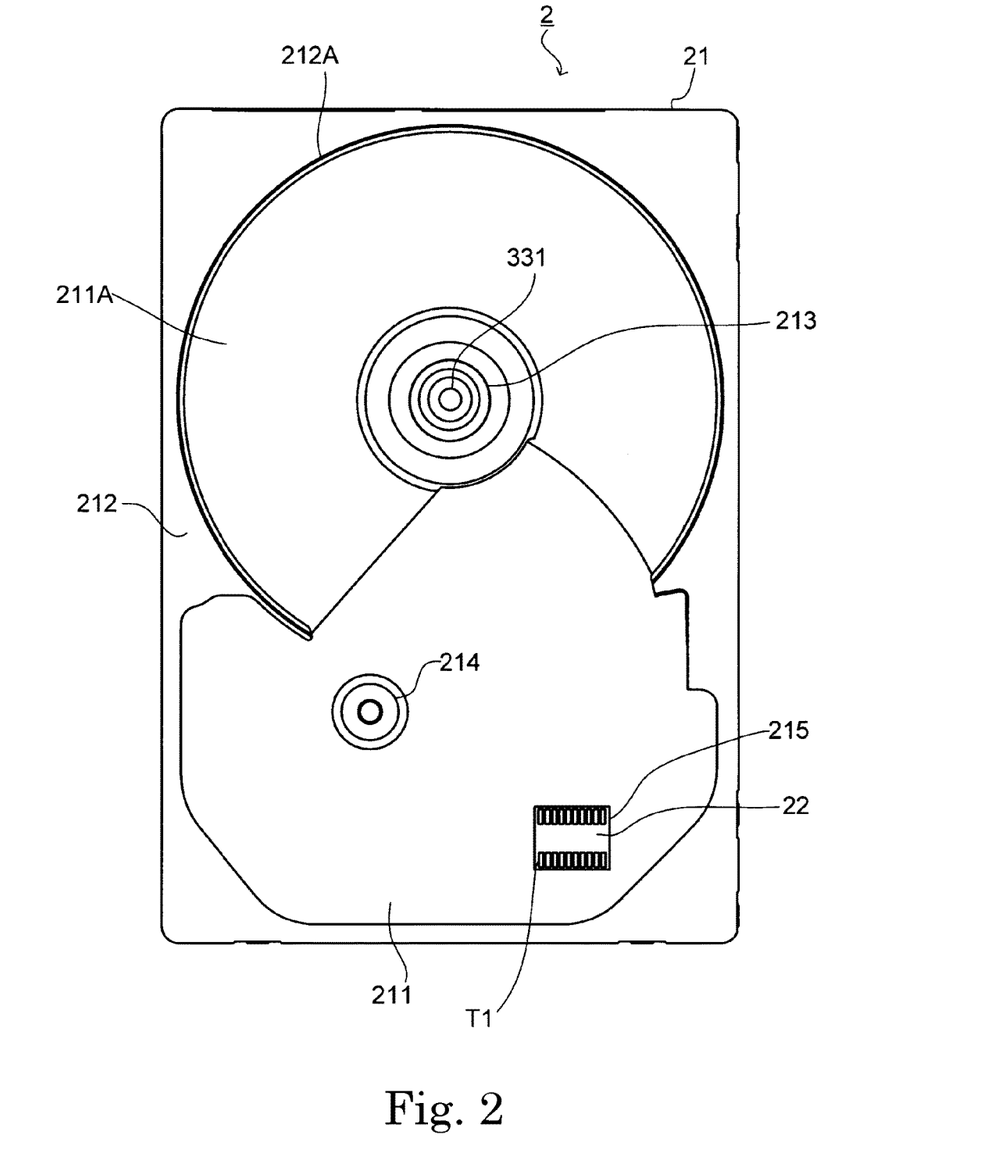
FIG. 2 is a top plan view of a base unit according to a preferred embodiment of the present invention.

FIG. 2 is a top plan view of the base unit 2. The base member 21 of the base unit 2 is a metal member made of, for example, aluminum. The bottom portion 211 and a side wall portion 212 of the base member 21 are molded by a die casting process as a single continuous monolithic member.

The side wall portion 212 includes a partially cylindrical side surface 212A. The partially cylindrical side surface 212A is a portion of an inside surface of the side wall portion 212. The partially cylindrical side surface 212A is a portion of a cylindrical surface centered on the central axis J1. The partially cylindrical side surface 212A is arranged opposite to an outer circumference of each magnetic disk 4, which is arranged inside of the partially cylindrical side surface 212A. The partially cylindrical side surface 212A is defined inside of the side wall portion 212 by a cutting process, and is coated with a coating agent through electrodeposition coating. Note that the above coating using the coating agent is not limited to the electrodeposition coating, but may alternatively be accomplished through spray coating or the like, for example. This is also true of coating of another portion which will be described below as being accomplished through electrodeposition coating.

The base member 21 includes the bottom portion 211. The bottom portion 211 includes a disk opposing bottom surface 211A. The disk opposing bottom surface 211A is a portion of an upper surface of the bottom portion 211. The disk opposing bottom surface 211A is a portion of a substantially annular surface centered on the central axis J1. The disk opposing bottom surface 211A is arranged opposite to a lower surface of the magnetic disk 4 arranged above. The disk opposing bottom surface 211A is defined by a cutting process after the die casting process, and is coated with a coating agent through electrodeposition coating.

The shaft 331 of the spindle motor 3 is fixed to the bearing fixing portion 213 as suggested above. The bearing fixing portion 213 is defined inside of the disk opposing bottom surface 211A by a cutting process.

After the die casting process, a head actuator mechanism fixing portion 214 is defined by a cutting process at a position away from the partially cylindrical side surface 212A and the disk opposing bottom surface 211A. The head actuator mechanism fixing portion 214 is arranged to project upward from the bottom portion 211. The head actuator mechanism fixing portion 214 is arranged to rotatably fix a portion of the head actuator mechanism 63.

Figure 3:
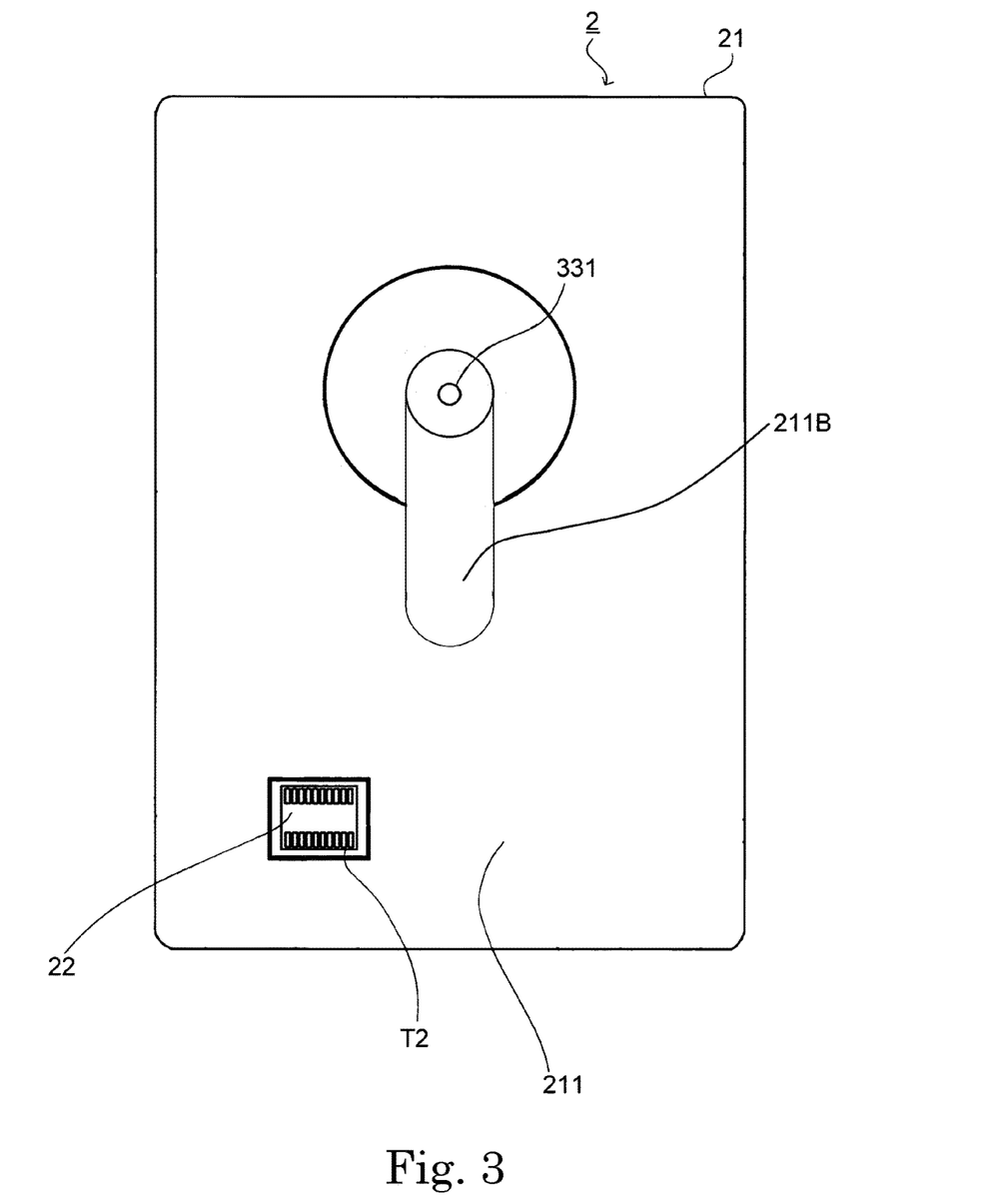
FIG. 3 is a bottom plan view of the base unit.

FIG. 3 is a bottom plan view of the base unit 2. An FPC mounting portion 211B is defined in a lower surface of the bottom portion 211. The FPC mounting portion 211B is a portion slightly recessed upward and on which a first FPC (a flexible printed circuit board), which is not shown, is mounted. The FPC mounting portion 211B is defined in the vicinity of the shaft 331 when viewed from below.

Here, a control circuit board (not shown) is fixed to the lower surface of the bottom portion 211 on the lower side in FIG. 3. Various circuits are formed on the control circuit board. The control circuit board is electrically connected to one end portion of the first FPC mounted on the FPC mounting portion 211B. Lead wires extending from the coils 311 (see FIG. 1) included in the stator 31 are electrically connected to another end portion of the first FPC. This allows electric currents to be supplied from a drive circuit formed on the control circuit board to the coils 311 through the first FPC to drive the spindle motor 3 to rotate.

In addition, a hole portion 215 (see FIG. 2) passing through the bottom portion 211 in the vertical direction is defined in the bottom portion 211 at a position away from the head actuator mechanism fixing portion 214. The connector 22, which is defined by a feedthrough, is fixed to the lower surface of the bottom portion 211 through an adhesive. In the situation in which the connector 22 is thus fixed, terminals T1 arranged in an upper surface of the connector 22 are exposed upwardly through the hole portion 215. Terminals T2 (see FIG. 3) each of which corresponds to a separate one of the terminals T1 are arranged in a lower surface of the connector 22. The control circuit board is arranged to cover the lower surface of the connector 22, and is electrically connected to each terminal T2.

Figure 4:
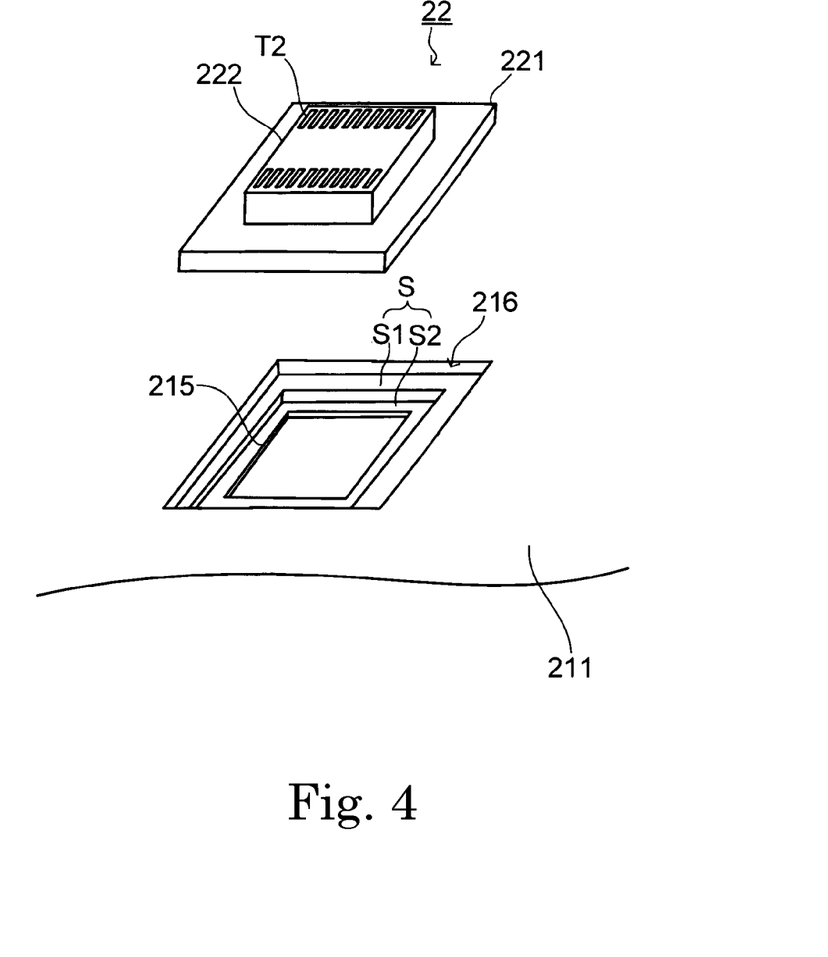
FIG. 4 is an exploded perspective view of an airtight structure realized by a connector, illustrating a base member as viewed from below, according to a preferred embodiment of the present invention.

Next, an airtight structure realized by the connector 22, which is defined by the feedthrough, to seal in the low-density gas will now be described in detail below. FIG. 4 is an exploded perspective view of the airtight structure realized by the connector 22, illustrating the base member 21 as viewed from below. That is, the lower side in FIG. 4 corresponds to the upper side.

The bottom portion 211 of the base member 21 includes a recessed portion 216 which extends in radial directions and is recessed upward from the lower surface of the bottom portion 211. The recessed portion 216 includes a recessed portion loop-shaped surface S, which is a loop-shaped surface perpendicular to the vertical direction. The recessed portion 216 is recessed in two steps from the lower surface of the bottom portion 211. Accordingly, the recessed portion loop-shaped surface S includes a first recessed portion loop-shaped surface S1, which is defined by a first-step recess, and a second recessed portion loop-shaped surface S2, which is defined by a second-step recess.

The hole portion 215, which passes through an area enclosed by the second recessed portion loop-shaped surface S2 in the vertical direction, is defined in the bottom portion 211. In other words, the base member 21 includes the hole portion 215 passing through the recessed portion 216 in the vertical direction. The second recessed portion loop-shaped surface S2 is arranged on the side of the first recessed portion loop-shaped surface S1 closer to the hole portion 215.

The connector 22 includes a plate-shaped base portion 221 and a body portion 222 arranged to project downward from the base portion 221. The terminals T2 are arranged in a lower surface of the body portion 222. The terminals T1 (see FIG. 2), which are not shown in FIG. 4, are arranged in an upper surface of the base portion 221.

A method by which the connector 22 is fixed to the base member 21 will now be described below. Note that, when the connector 22 is fixed thereto, a lower surface of the base member 21 is arranged to face in a direction opposite to the direction of gravity (that is, the direction of gravity points downward in FIG. 4). An adhesive is applied onto the first recessed portion loop-shaped surface S1 such that the adhesive will extend all the way around the hole portion 215. As this adhesive, an anaerobic adhesive, for example, is used. With the adhesive applied on the first recessed portion loop-shaped surface S1, the connector 22 are pressed against the first recessed portion loop-shaped surface S1. The connector 22 is thus arranged on the lower side of the recessed portion 216 to cover the hole portion 215. The adhesive intervenes between the connector 22 and the recessed portion 216. As a result of the adhesive being cured, the connector 22 is fixed to the base member 21.

Figure 5:
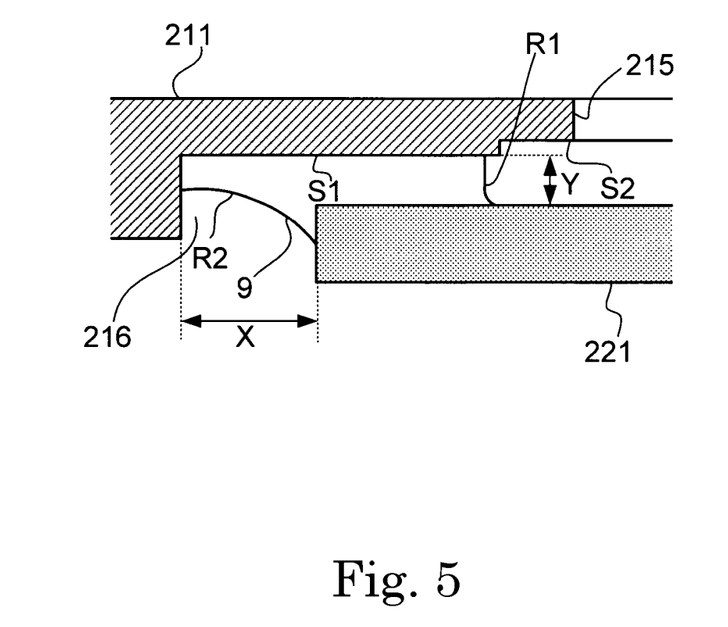
FIG. 5 is a side sectional view of the connector and a bottom portion fixed to each other according to a preferred embodiment of the present invention.

FIG. 5 is a side sectional view of the connector 22 and the bottom portion 211 fixed to each other. As illustrated in FIG. 5, an adhesive 9 is arranged between the base portion 221 of the connector 22 and the recessed portion 216. The adhesive 9 intervenes between an outer end of the base portion 221 and an inner end of the recessed portion 216 and between the upper surface of the base portion 221 and the first recessed portion loop-shaped surface S1.

A minimum value of a gap distance X between the outer end of the base portion 221 and the inner end of the recessed portion 216 in a radial direction in which the outer end of the base portion 221 and the inner end of the recessed portion 216 are opposed to each other with the adhesive 9 therebetween is greater than a minimum value of a gap distance Y between the upper surface of the base portion 221 and the first recessed portion loop-shaped surface S1 in the vertical direction, in which the upper surface of the base portion 221 and the first recessed portion loop-shaped surface S1 are opposed to each other with the adhesive 9 therebetween.

As described above, in the present preferred embodiment, the minimum value of the gap distance X as illustrated in FIG. 5 is arranged to be greater than the minimum value of the gap distance Y, and therefore, a narrow gap having the gap distance Y can be defined, and the adhesive 9 can be forced into this gap by capillary action. The minimum value of the gap distance X is arranged to be, for example, 0.5 mm, and the minimum value of the gap distance Y is arranged to be, for example, 0.2 mm or less. This contributes to effectively preventing the low-density gas sealed in the housing space defined by the base member 21 and the cover 5 from leaking out through the hole portion 215 and the gap having the gap distance Y.

Further, because the adhesive 9 is actively forced toward the upper side of the base member 21 by capillary action, the likelihood that the adhesive 9 will leak out to the lower side of the base member 21 is reduced. This in turn reduces the likelihood that a portion of the adhesive 9 will leak out to be attached to the control circuit board, causing a failure of the spindle motor 3 to rotate or another malfunction.

Furthermore, the adhesive 9, which is pressed by the connector 22 at the time of the adhesion of the connector 22, travels longer distances in narrower gaps. Therefore, the adhesive can be actively forced into the narrow gap having the gap distance Y, which is defined in the present preferred embodiment.

Although, in FIG. 5, a surface R1 of the adhesive 9 on the side closer to the hole portion 215 is defined between the upper surface of the base portion 221 and the first recessed portion loop-shaped surface S1, the surface R1 may alternatively be defined between the upper surface of the base portion 221 and the second recessed portion loop-shaped surface S2. This allows the adhesive 9 to be more actively forced toward the upper side of the base member 21.

A portion of a surface R2 of the adhesive 9 on the side opposite to the side closer to the hole portion 215 is defined between the upper surface of the base portion 221 and the first recessed portion loop-shaped surface S1. At the time of the adhesion of the connector 22, the adhesive 9 does not easily travel in the wider gap having the gap distance X, and the adhesive 9 can be actively forced into the narrower gap having the gap distance Y.

Furthermore, the adhesive 9 preferably includes an inorganic filler. The inorganic filler may be one of, or a mixture of two or more of, the following group of materials: metal, mineral, glass, and glass bead. If the filler includes metal, the metal may be one or more of the following group of metals: aluminum, silver, copper, nickel, and titanium. If the filler includes mineral, the mineral may be one or more of the following group of minerals: mineral oxide, mineral carbonate, and mineral sulfate. If the filler includes mineral oxide, the mineral oxide may be one or more of the following group of mineral oxides: silica, aluminum oxide, and titanium oxide. For example, the mineral carbonate may be calcium carbonate. As another example, the mineral sulfate may be barium sulfate.

According to an exemplary embodiment of the present invention, the adhesive 9 includes inorganic filler which contributes to effectively preventing the low-density gas sealed in the housing space defined by the base member 21 and the cover 5 from leaking out through the hole portion 215 or the gap between the base member 21 and the cover 5. Using an adhesive 9 including an inorganic filler is more effective at sealing helium as compared with an adhesive not including an inorganic filler, as illustrated in FIG. 6A to FIG. 7B below.

Figure 6A:
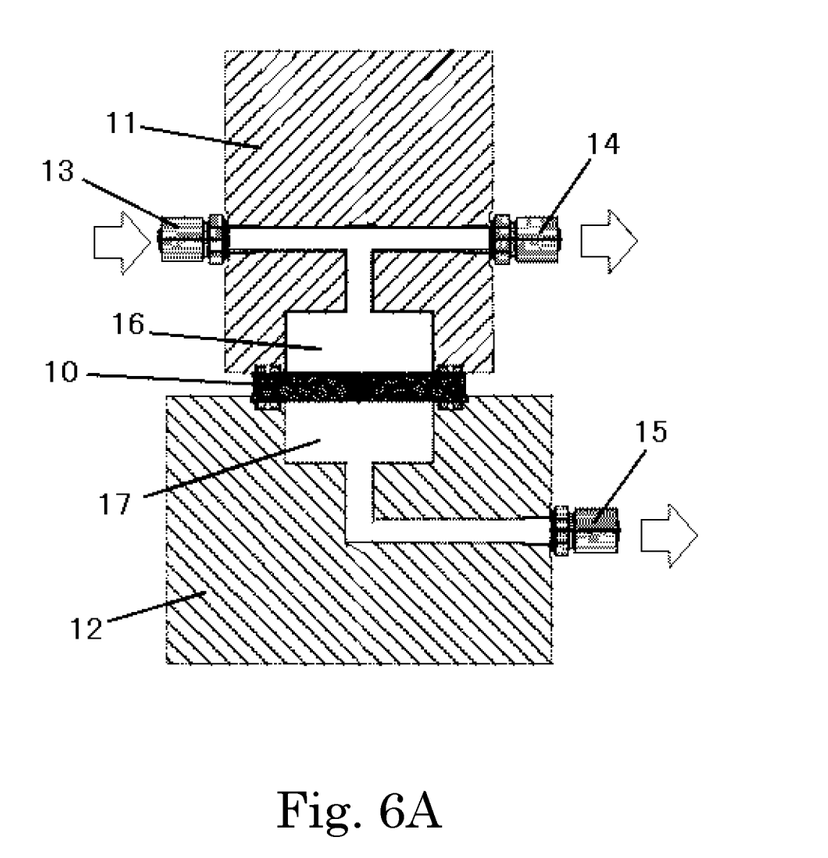
FIG. 6A is a schematic view of an apparatus for testing helium permeability of a material according to a preferred embodiment of the present invention.
Figure 6B:
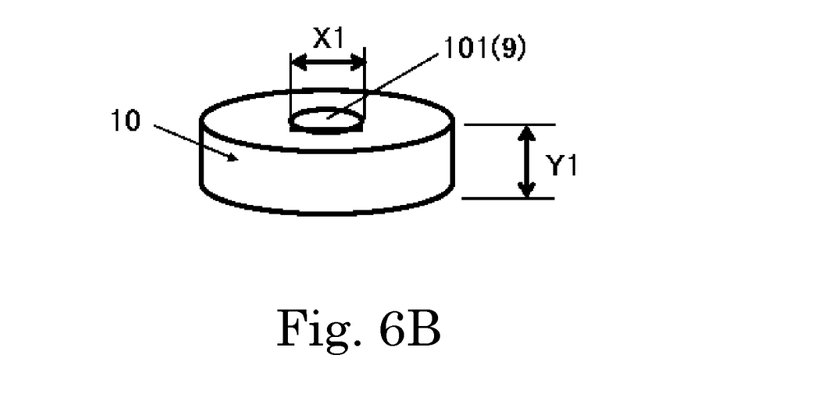
FIG. 6B is an enlarged schematic view of a testing element of the apparatus for testing helium permeability of a material according to a preferred embodiment of the present invention.

FIG. 6A is a schematic view of an apparatus for testing helium permeability of a material according to a preferred embodiment of the present invention. FIG. 6B is an enlarged schematic view of a testing element of the apparatus.

To test the helium permeability of a material, as illustrated in FIG. 6A and FIG. 6B, first the tester 10 is prepared with the adhesive to be tested. The tester 10 may be shaped like a cylinder or a circular plate including a hollow portion 101. The thickness Y1 of the tester 10 may be, for example, 1.5 mm. A diameter of the hollow portion 101 may be, for example, 2.0 mm. The adhesive 9 is applied to the tester 10 to cover the hollow portion 101. The tester 10 is then secured between a work 11 and a work 12. Work 11 includes an opening 16, and work 12 includes an opening 17, between which the tester 10 is situated such that the entire opening 16 and the entire opening 17 are separated by the tester 10. Furthermore, the work 11 includes a valve 13 and a valve 14 which may be spatially connected to opening 16, to connect the opening 16 to the environment external to the apparatus. The work 12 includes a valve 15 which may be spatially connected to opening 17, to connect the opening 17 to the environment external to the apparatus.

Using valve 13 and valve 14, a vacuum is created in the opening 16. A suction is applied to the valve 14, while the valve 13 remains closed. As the result of this, the opening 16 becomes vacuum. Similarly, a vacuum is created in the opening 17 by applying a suction to the valve 15.

The valve 13 and the valve 15 are then opened, and helium is injected to the opening 16 from the valve 13 with a predetermined pressure. A part of the helium passes through the adhesive applied to the hollow 101 in the tester 10, to reach the opening 17, the valve 15, and the environment outside the apparatus. At the valve 15, a detector (not illustrated) is installed which detects the amount of helium passing through the valve 15 into the environment external to the apparatus, reflecting the helium leaking through the adhesive applied to the tester 10. After testing adhesives using this apparatus, it is found that amount of helium leakage through the adhesive 9 including an inorganic filler is less than the amount of helium leakage through the adhesive 9 which does not include an inorganic filler.

Figure 7A:
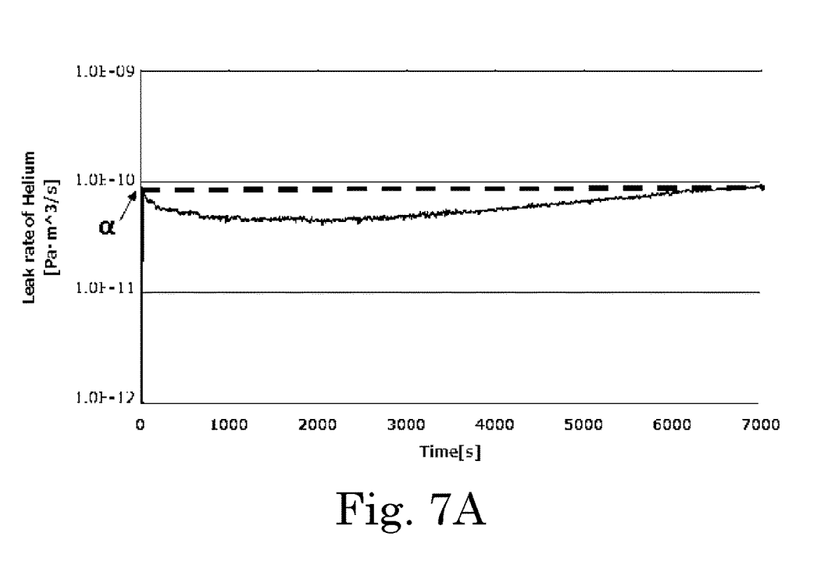
FIG. 7A is a graph illustrating a fluctuation of helium leakage over time during testing of a material in the apparatus of FIG. 6A, according to a preferred embodiment of the present invention.
Figure 7B:
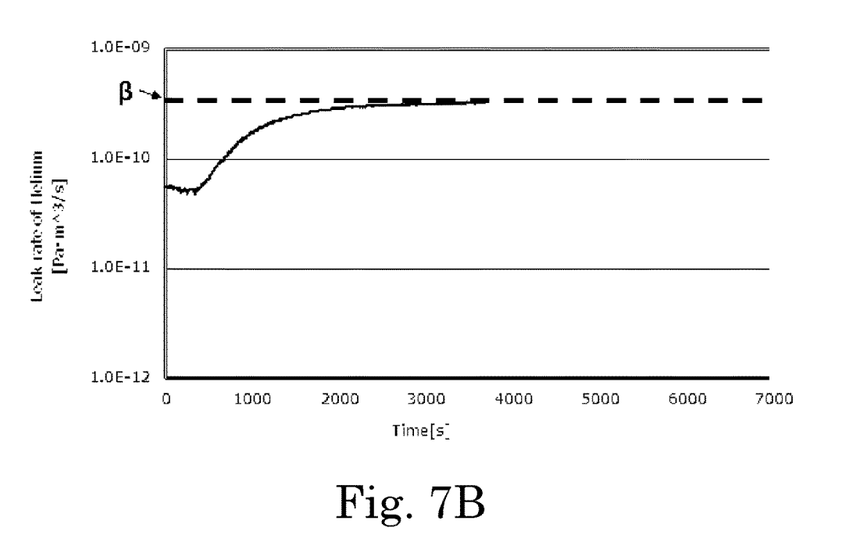
FIG. 7B is a graph illustrating a fluctuation of helium leakage over time during testing of a material in the apparatus of FIG. 6A, according to a preferred embodiment of the present invention.

FIG. 7A is a graph illustrating a fluctuation of helium leakage over time during testing of an adhesive 9 including inorganic filler, according to a preferred embodiment of the present invention. FIG. 7B is a graph illustrating a fluctuation of helium leakage over time during testing of an adhesive not including an inorganic filler. In both FIG. 7A and FIG. 7B, the vertical axis represents the amount of helium leakage, while the horizontal axis represents time. FIG. 7A illustrates the results of testing an adhesive including Aluminum oxide as a filler. FIG. 7B illustrates the results of testing an adhesive having no filler. As illustrated in FIG. 7A, a vertical value of helium leakage converges to a value a, while in FIG. 7B, a vertical value of helium leakage converges to a value such that a is smaller than β. In the other words, the amount of helium leakage through the adhesive 9 including an inorganic filler is less than that of the adhesive which does not include an inorganic filler.

Figure 8A:
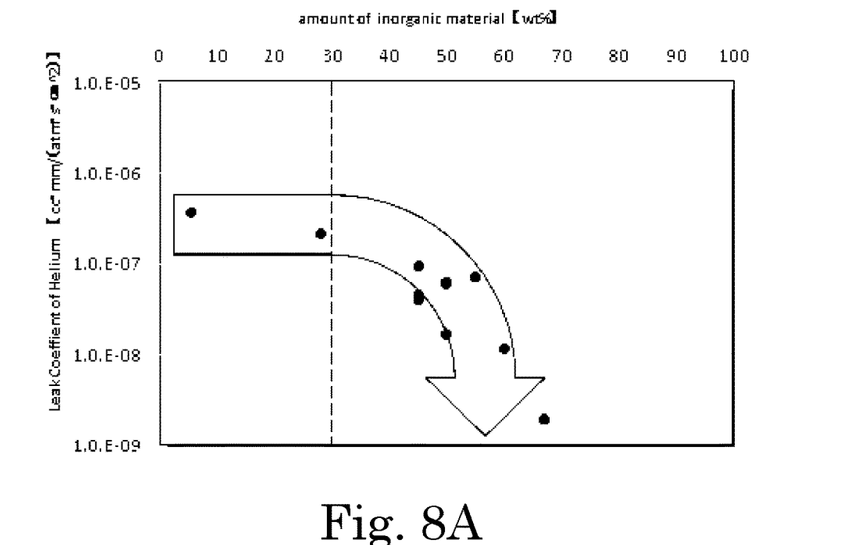
FIG. 8A is a graph illustrating a leak coefficient of helium to the amount of inorganic filler included in the adhesive, by weight, according to a preferred embodiment of the present invention.
Figure 8B:
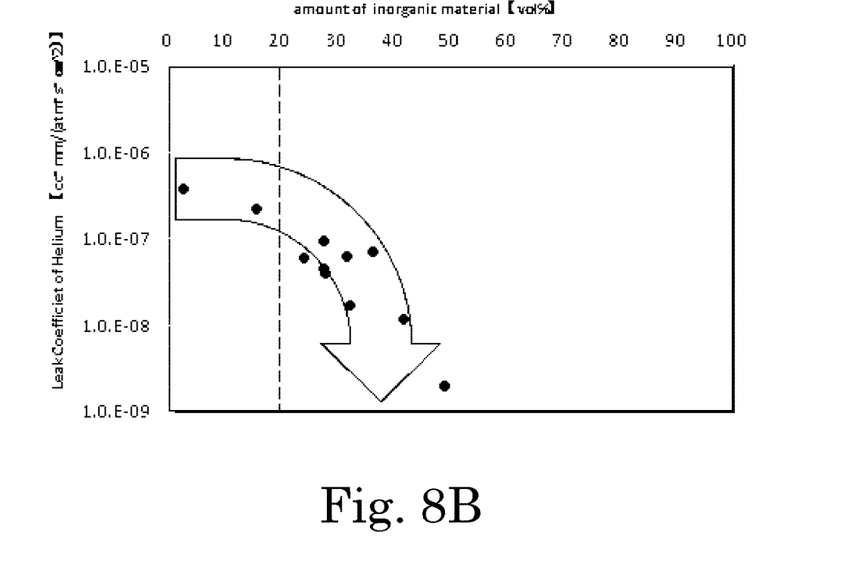
FIG. 8B is a graph illustrating a leak coefficient of helium to the amount of inorganic filler included in the adhesive, by volume, according to a preferred embodiment of the present invention.
Figure 9:
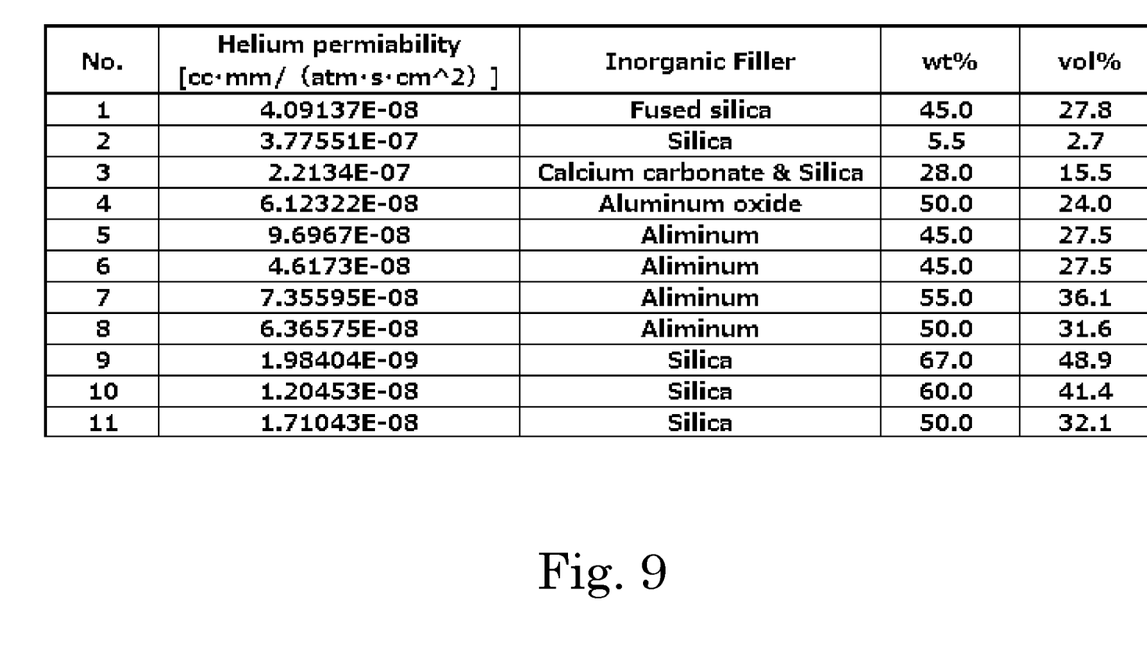
FIG. 9 is a table of the inorganic fillers included in the graphs of FIGS. 8A and 8B.

FIG. 8A is a graph illustrating a leak coefficient of helium to the amount of inorganic filler included in the adhesive, by weight (wt %), according to a preferred embodiment of the present invention. FIG. 8B is a graph illustrating a leak coefficient of helium to the amount of inorganic filler included in the adhesive, by volume (vol %), according to a preferred embodiment of the present invention. As shown in FIG. 8A, there is a tendency for the helium permeability coefficient to drop sharply if the content of the inorganic filler exceeds 30 wt %. Similarly, as shown in FIG. 8B, there is a tendency for the helium permeability coefficient to drop sharply if the content of the inorganic filler exceeds 20 vol %. In an exemplary embodiment of the present invention, an amount of inorganic filler that is greater than 30 wt % or 20 vol % contributes to effectively preventing the low-density gas sealed in the housing space defined by the base member 21 and the cover 5 from leaking out through the hole portion 215 or the gap between the base member 21 and the cover 5. FIG. 9 is a table of the inorganic fillers included in the graphs of FIGS. 8A and 8B.

While preferred embodiments of the present invention have been described above, the preferred embodiments may be modified in various manners without departing from the scope and spirit of the present invention.

For example, the connector used to seal in the low-density gas is not limited to the feedthrough as described above, but may alternatively be a connector defined by a low temperature co-fired ceramic (LTCC).

Preferred embodiments of the present invention are applicable to disk drive apparatuses, such as, for example, HDDs.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A base unit for use in a disk drive apparatus in which a gas with a density lower than that of air is sealed in a housing space defined by a base member and a cover fixed to each other, the base unit comprising:
    the base member that supports a motor rotatable about a central axis extending in a vertical direction; and
    a connector electrically connected to a wire in the housing space; wherein
    the base member includes:
    a recessed portion extending in radial directions and recessed upward from a lower surface of the base member; and
    a hole extending through the recessed portion in the vertical direction;
    the recessed portion includes a recessed portion loop-shaped surface defining a loop-shaped surface in the radial direction;
    the connector is located on a lower side of the recessed portion to cover the hole;
    an adhesive is located between the connector and the recessed portion; and
    a minimum value of a gap distance in the radial direction between an outer end of the connector and an inner end of the recessed portion in which the outer end of the connector and the inner end of the recessed portion are opposed to each other with the adhesive therebetween is greater than a minimum value of a gap in the vertical direction distance between an upper surface of the connector and the recessed portion loop-shaped surface, in which the upper surface of the connector and the recessed portion loop-shaped surface are opposed to each other with the adhesive therebetween; wherein
    the adhesive includes an inorganic filler; and
    the inorganic filler includes one of mineral oxide, mineral carbonate, and mineral sulfate.

2. The base unit according to claim 1, wherein the inorganic filler includes one of silica, aluminum oxide, titanium oxide, calcium carbonate, and barium sulfate.

3. A disk drive apparatus comprising:
    the base unit of claim 1;
    the cover;
    the motor; and
    an access portion that performs at least one of reading and writing of information from or to a disk supported by the motor; wherein
    the motor and the access portion are accommodated in the housing space.

4. A base unit for use in a disk drive apparatus in which a gas with a density lower than that of air is sealed in a housing space defined by a base member and a cover fixed to each other, the base unit comprising:
    the base member that supports a motor rotatable about a central axis extending in a vertical direction; and
    a connector electrically connected to a wire in the housing space; wherein
    the base member includes:
    a recessed portion extending in radial directions and recessed upward from a lower surface of the base member; and
    a hole extending through the recessed portion in the vertical direction;
    the recessed portion includes a recessed portion loop-shaped surface defining a loop-shaped surface in the radial direction;
    the connector is located on a lower side of the recessed portion to cover the hole;
    an adhesive is located between the connector and the recessed portion; and
    a minimum value of a gap distance in the radial direction between an outer end of the connector and an inner end of the recessed portion in which the outer end of the connector and the inner end of the recessed portion are opposed to each other with the adhesive therebetween is greater than a minimum value of a gap in the vertical direction distance between an upper surface of the connector and the recessed portion loop-shaped surface, in which the upper surface of the connector and the recessed portion loop-shaped surface are opposed to each other with the adhesive therebetween; wherein
    the adhesive includes an inorganic filler; and
    the inorganic filler includes at least about 30 wt % of the adhesive.

5. A disk drive apparatus comprising:
    the base unit of claim 4;
    the cover;
    the motor; and
    an access portion that performs at least one of reading and writing of information from or to a disk supported by the motor; wherein
    the motor and the access portion are accommodated in the housing space.

6. A base unit for use in a disk drive apparatus in which a gas with a density lower than that of air is sealed in a housing space defined by a base member and a cover fixed to each other, the base unit comprising:
    the base member that supports a motor rotatable about a central axis extending in a vertical direction; and
    a connector electrically connected to a wire in the housing space; wherein
    the base member includes:
    a recessed portion extending in radial directions and recessed upward from a lower surface of the base member; and
    a hole extending through the recessed portion in the vertical direction;
    the recessed portion includes a recessed portion loop-shaped surface defining a loop-shaped surface in the radial direction;
    the connector is located on a lower side of the recessed portion to cover the hole;
    an adhesive is located between the connector and the recessed portion; and a minimum value of a gap distance in the radial direction between an outer end of the connector and an inner end of the recessed portion in which the outer end of the connector and the inner end of the recessed portion are opposed to each other with the adhesive therebetween is greater than a minimum value of a gap in the vertical direction distance between an upper surface of the connector and the recessed portion loop-shaped surface, in which the upper surface of the connector and the recessed portion loop-shaped surface are opposed to each other with the adhesive therebetween; wherein the adhesive includes an inorganic filler; and a volume percentage of the inorganic filler among the adhesive is about 20 vol % or greater.

7. A disk drive apparatus comprising:

the base unit of claim 6;

the cover;

the motor; and an access portion that performs at least one of reading and writing of information from or to a disk supported by the motor; wherein the motor and the access portion are accommodated in the housing space.

* * * * *

UNITED STATES PATENT AND TRADEMARK OFFICE
CERTIFICATE OF CORRECTION

PATENT NO. : 10,347,301 B2  
APPLICATION NO. : 16/104585  
DATED : July 9, 2019  
INVENTOR(S) : Masahiro Akagi et al.

Page 1 of 1

It is certified that error appears in the above-identified patent and that said Letters Patent is hereby corrected as shown below:

On the Title Page

Item (72) Inventors, please add the following inventors:  
Jiro KANEKO, Yokohama-shi, Kanagawa-ken (JP)  
Takako HAYAKAWA, Hiratsuka-shi, Kanagawa-ken (JP)  
Kimihiko SUDO, Yokohama-shi, Kanagawa-ken (JP)  
Yuta ONOBU, Atsugi-shi, Kanagawa-ken (JP).

Signed and Sealed this  
Fifth Day of November, 2019

Andrei Iancu  
*Director of the United States Patent and Trademark Office*